United States Patent
Hugo

(10) Patent No.: US 10,342,387 B1
(45) Date of Patent: Jul. 9, 2019

(54) CUTTING BOARD

(71) Applicant: Edgar Hugo, Miami, FL (US)

(72) Inventor: Edgar Hugo, Miami, FL (US)

( * ) Notice: Subject to any disclaimer, the term of this patent is extended or adjusted under 35 U.S.C. 154(b) by 0 days.

(21) Appl. No.: 16/053,735

(22) Filed: Aug. 2, 2018

(51) Int. Cl.
*A47J 47/00* (2006.01)

(52) U.S. Cl.
CPC .................................. *A47J 47/005* (2013.01)

(58) Field of Classification Search
CPC .......... A47J 47/00; A47J 47/005; A47J 47/20; B65D 21/0215
See application file for complete search history.

(56) References Cited

U.S. PATENT DOCUMENTS

| | | | | |
|---|---|---|---|---|
| 2,221,238 A * | 11/1940 | Johnson | ................... | F16B 47/00 248/205.5 |
| 2,866,556 A * | 12/1958 | Hinz | ...................... | A47J 47/005 210/498 |
| 2,916,239 A * | 12/1959 | Stopps | ............... | B65D 19/0051 108/53.3 |
| 2,924,830 A * | 2/1960 | De Long | ................. | A47B 87/02 108/91 |
| 3,958,797 A * | 5/1976 | Brow | .................... | A21C 11/008 269/302.1 |
| 4,838,176 A * | 6/1989 | Bowser, Sr. | ........ | B65D 19/0018 108/53.3 |
| 6,409,138 B1 * | 6/2002 | Baccini | ................. | H05K 3/0097 108/53.1 |
| 6,422,551 B1 * | 7/2002 | Brotz | .................... | A47J 47/005 269/13 |
| 6,478,292 B1 * | 11/2002 | Sellers | ................... | A47J 47/005 269/285 |
| 8,191,486 B2 * | 6/2012 | Apps | ................... | B65D 19/0018 108/53.3 |
| 8,943,661 B2 * | 2/2015 | Krohmer | ................. | B25B 11/00 269/289 R |
| 2003/0165599 A1 * | 9/2003 | Griffin | ................... | A47J 19/005 426/302 |
| 2004/0150151 A1 * | 8/2004 | Diermeier | ............. | A47J 47/005 269/289 R |
| 2005/0039607 A1 * | 2/2005 | Cornfield | .............. | A47J 47/005 99/324 |
| 2007/0170629 A1 * | 7/2007 | Goldman | .............. | A47J 47/005 269/289 R |
| 2007/0245573 A1 * | 10/2007 | Willen | .................. | A47J 47/005 30/302 |
| 2017/0273512 A1 * | 9/2017 | Raffalt | .................. | A47J 47/005 |

FOREIGN PATENT DOCUMENTS

GB            191981 A  *  1/1923  ............ A47J 47/005

* cited by examiner

*Primary Examiner* — Tyrone V Hall, Jr.
(74) *Attorney, Agent, or Firm* — Christopher J. Vandam, PA; Chris Van Dam

(57) ABSTRACT

A rectangular cutting board having a foot at each corner. Each foot extends above and below the board. Each foot extends beyond each adjacent edge so that in any orientation of the board on a flat surface no part of the board touches the counter. The feet each has an edge perpendicular to the surface of the cutting board to stand the board vertically for drying or storage. The bottom of the feet are concave and the top of the feet are convex. When multiple similarly sized boards are horizontally stacked the bottom side of the feet compliment and nest into the top of the feet of the cutting board below.

3 Claims, 3 Drawing Sheets

CUTTING BOARD

BACKGROUND OF THE INVENTION

1. Field of the Invention

The present invention relates to kitchen cooking devices, and more particularly, to an improved cutting board.

2. Description of the Related Art

Several designs for cutting boards have been designed in the past. None of them, however, includes feet at each corner of the board that extend beyond both upper and lower surfaces and beyond both adjacent edges of the board. These features prevent any surface or edge of the board from contacting a flat surface, such as a counter top, in all orientations of the cutting board.

Applicant believes that the closest reference corresponds to commercially available cutting boards that include feet. However, it differs from the present invention because other the present invention has feet in each corner of a generally rectangular cutting board that extend beyond both top and bottom surfaces and extend beyond both adjacent edges that form each of the four corners of the board.

The present invention is further distinguished from all known prior art in the lower surface of each of the feet is concave and supple to better form a non-slip contact with the counter upon which the cutting board is being used. The top surface of each of the feet is convex to complement the concavity of the upper surface so that boards can stack in a stable configuration with airspace between boards.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main objects of the present invention to provide a cutting board that when in any position both surfaces and all four edges of the cutting board do not contact a counter top.

It is another object of this invention to provide a cutting board that stands vertically on any two adjacent feet without further support.

It is still another object of the present invention to provide a cutting board that securely nests with other similarly dimensioned cutting boards without the surfaces touching thereby preventing cross contamination of the board surfaces.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
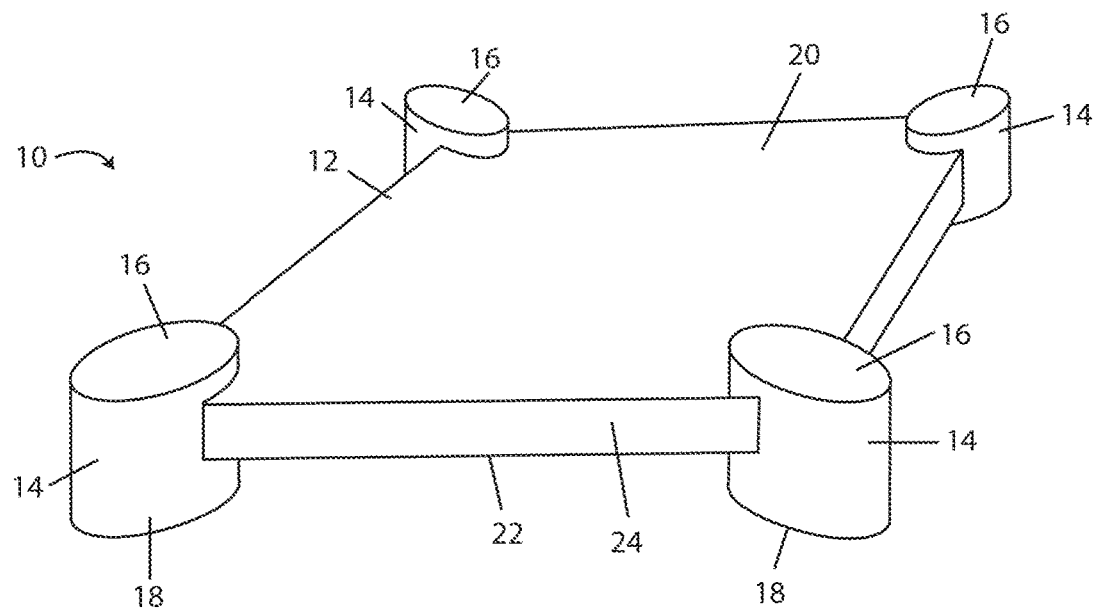
FIG. 1 shows a perspective view of a cutting board.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the cutting board, the board, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Cross-contamination in the kitchen has long been a problem. Raw meats, poultry and fish should be carefully handled around foods that are not cooked, such as some vegetables. Surfaces such as cutting boards, counters, knives and other tools can transfer biological hazards that can result in illnesses for those that come into contact with those substances or eat them.

Prior art designs for cutting boards usually lay flat on the counter top and may come into contact with hazardous substances that were previously on that counter top. Even cleaning will not always remove all contaminants.

Keeping a cutting board from contacting the underlying counter top in the first place goes far towards preventing it from depositing hazards onto the counter when used with, for example, raw meat. Further, the next user of that surface can also avoid contact with deposits of hazards on the counter top by elevating the cutting board.

Even after washing care must be taken to not re-contaminate a cutting board. Stacking flat cutting boards while wet can inhibit the drying process and risk contaminating that cutting board after the washing process is complete.

Referring now to the drawings, where the present invention is generally referred to with numeral 10, it can be observed that it basically includes a board 12, feet 14, a top 16, a bottom 18, a surface 20, a surface 22, an edge 23, an edge 24, an edge 25, a counter 26 and an edge 27.

The board 12 is generally rectangular and has an upper surface 20 and a parallel lower surface 22. The sides of the board 12 are bounded by edges 23, 24, 25 and 27. At each corner of the board is a foot 14 for a total of four feet 14.

Figure 5:
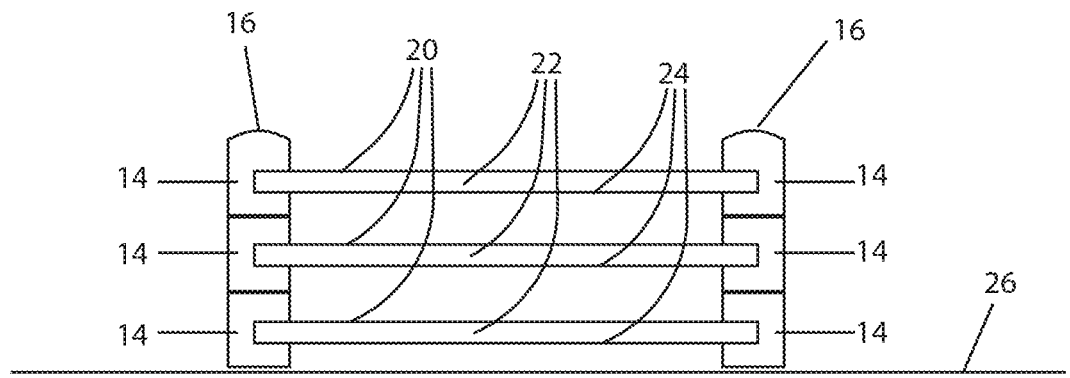
FIG. 5 shows an elevation view of several cutting boards stacked on a counter top.
Figure 6:
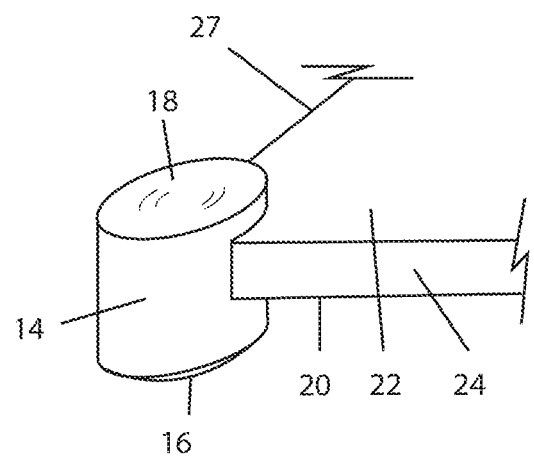
FIG. 6 shows a detail perspective view of a bottom side of a foot on a cutting board.

The top 16 of each of the feet 14 is convex. The bottom 18 of each of the feet 14 is concave. The dimensions and concavity of the bottoms 18 are complimentary of the convex top 16 so they essentially nest with feet 14 of a second cutting board when stacked such as seen in FIG. 5.

The concave bottom 18 is made of a supple material such as plastic or rubber. When the bottom 18 is pressed against a counter top 26 the supple bottom 18 tends to be anti-skid and holds the cutting board 12 in place on the counter 26. Further, the supple bottom 18 can deform slightly and act somewhat like a suction cup to lend further anti-skid character to the board and limit slipping on the counter 26.

Figure 2:
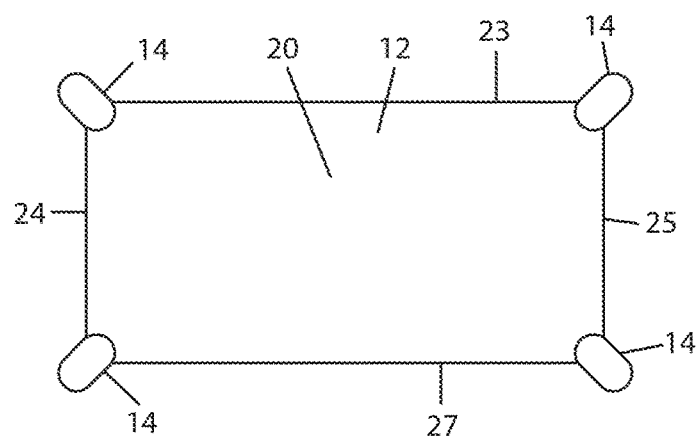
FIG. 2 shows a top side plan view of a cutting board.
Figure 3:
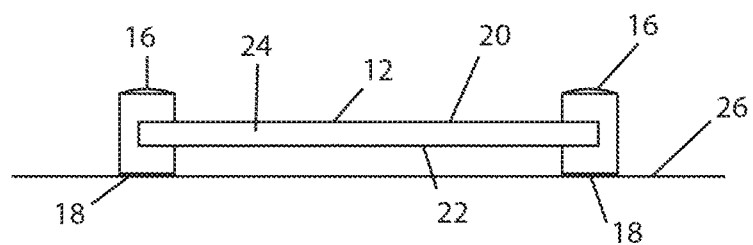
FIG. 3 shows a side elevation view of a cutting board resting on all four feet on a counter top.

The feet 14 each extend above the plane of surface 20 and below the plane of surface 22. In a stacking mode, such as shown in FIG. 5, the feet 14 rest on top of the feet 14 of the cutting board below. The feet 14 are affixed to the corners of the board at about a forty-five degree angle as best seen in FIG. 2.

Figure 4:
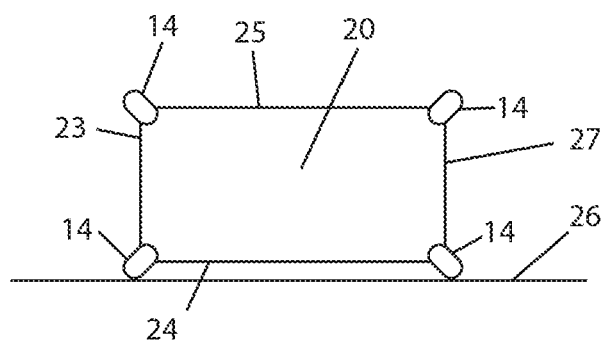
FIG. 4 shows a side elevation view of a cutting board standing vertically on two of its feet on a counter top.

The forty-five degree angle is not critical. It is important that the feet 14 extend beyond both adjacent edges. For example, in FIG. 4 when the board is standing on it edge 24, the edge 24 does not touch the counter 26. The board is held off the counter by the feet 14 located at the intersection of edges 23 and 23 and the feet at the intersection of edges 24 and 27. In fact, standing the board on any two adjacent feet 14 will hold the cutting board off of the counter 26 so that without contact all cross-contamination can be avoided.

When the cutting board is set onto any flat surface, in any orientation, only the feet 14 will touch the cutting board. This applies equally to the edges 23, 24, 25 and 27 as will as the surfaces 20 or 22. Taking this example further, if tossed onto a flat floor or flat counter 26 it will land only touching on the feet 14 and no part of the board 12 itself will come into contact with that floor or counter 26.

By having the board suspended off the counter it is easy for the use to pick up the board by placing their fingers under the edge and lifting the board. This is true especially because a cook often will have wet or slippery fingers. The entire edge is off the underlying surface so both hands can get a grasp under the board to pick it up without slipping. Similarly, the entire stack of boards can easily be lifted together because they all nest and stack securely together. No more boards slipping against each other when moving the boards.
]
The gap between boards when stacked and the gap between the bottom board and the counter permit adequate airflow to dry the boards while in the stacked and stored mode. A rapid airdry can also aid in the boards drying without water spotting. This allows the aesthetics of the boards to be improved by having a more clean and pure appearance after washing without towel drying.

Avoiding contact between adjacent boards also avoids cross-contamination between the boards thereby increasing food safety and decreasing pathogens, germs and soiling from passing between boards that otherwise would be in direct contact.

When boards are stacked on top of each other several boards can occupy the space above the footprint of only one board. A dozen or more can be set on a counter top in the same area of space where one would lie flat. The feet also allow the boards to stand with the surface vertical. This allows another space saving configuration of the boards while in a storage mode.

Another advantage of the stacking feature is observed when multiple boards are used to prepare various ingredients. Each separate ingredient can be cut on its own cutting board and then stacked on the board until needed in the cooking process. For example, one herb is cut and left on the first board. Then a second ingredient is cut on another board. Before the third board is used the first two are stacked so that they retain the cut ingredients on their upper surfaces but only occupy the footprint of one board on the counter top. Multiple boards, each having their own ingredient on it, can be stacked and ready for use and only the area of one board is occupied by the stack.

Figure 7:
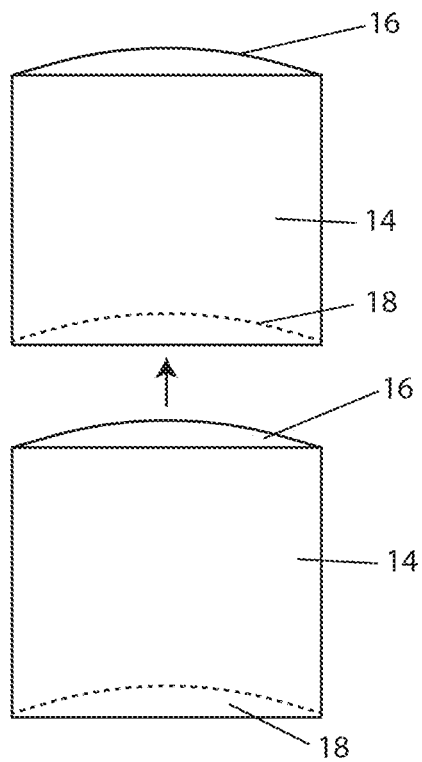
FIG. 7 shows an elevation view of a pair of feet in the stacking process.
Figure 8:
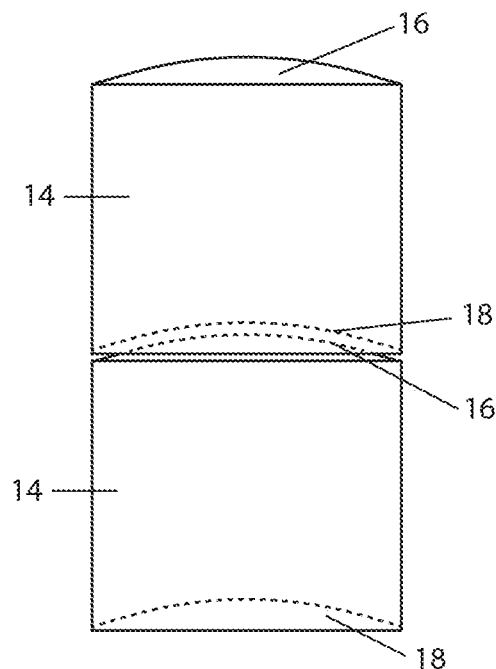
FIG. 8 shows an elevation view of a pair of stacked feet nested together.

Looking at FIGS. 7 and 8, a detail of the stacking and nesting feet are demonstrated. Each foot 14 has a top 16 that is convex and a bottom 18 that is concave. When the boards are aligned and stacked the convex top 16 of the lower foot 14 fits into the concave bottom 18 of the upper board. This way the boards have some lateral stability when stacked and stay in a neatly organized stack.

An important version of the invention can be fairly described as a cutting board comprised of a board and four feet, one foot at each corner. The board is rectangular and has an upper surface, a lower surface and four corners. Each of the corners has two adjacent edges that are perpendicular to each other. A foot is affixed to each corner of the board. Each foot has a top that extends above the upper surface of the board. Each foot has a bottom that extends below the lower surface of the board so that when the board is on a counter there is an airspace completely under the board. Each foot has a vertical edge perpendicular to the upper surface. When the board is stored vertically the vertical edge rests horizontally on the counter supporting the board upright. The vertical edge on each foot is outside a perimeter of the upper surface and extends beyond both adjacent edges so that the board is stably and vertically supported on any two adjacent feet on a counter without the board touching any part of a counter. The bottom of each foot is concave and the top of each foot is complimentary convex such that when multiple similarly dimensioned cutting boards are horizontally stacked the bottom of each foot nests onto the top of a corresponding foot on a lower cutting board. Essentially when horizontally stacked like this the boards occupy one footprint and all the corresponding feet stack up as seen in FIG. 5. Optionally, the bottom of each foot is sufficiently supple to suction cup onto the counter below to prevent slippage of the cutting board during use. Also optionally, the top of each foot is cut resistant because it could easily get nicked by a knife used to cut food on the surface of the board.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cutting board comprised of a board and four feet;
   the board is rectangular and has an upper surface, a lower surface and four corners;
   each of the corners has two adjacent edges;
   a foot is affixed to each corner of the board;
   each foot has a top that extends above the upper surface of the board;
   each foot has a bottom that extends below the lower surface of the board;
   each foot has a vertical surface perpendicular to the upper surface;
   the vertical surface on each foot is outside a perimeter of the upper surface and extends beyond both adjacent edges so that the board is stably and vertically supported on any two adjacent feet on a counter without the board touching any part of a counter;
   the bottom of each foot is concave and the top of each foot is complimentary convex such that when multiple similarly dimensioned cutting boards are horizontally stacked the bottom of each foot nests onto the top of a corresponding foot on a lower cutting board.

2. The cutting board of claim 1 further characterized in that the bottom of each foot is made from a supple material and performs as a suction cup onto the counter below.

3. The cutting board of claim 2 further characterized in that the top of each foot is only made from a cut resistant material.

\* \* \* \* \*